(12) United States Patent
Shi et al.

(10) Patent No.: US 9,290,107 B2
(45) Date of Patent: Mar. 22, 2016

(54) SYSTEM AND METHOD FOR ENERGY MANAGEMENT IN AN ELECTRIC VEHICLE

(76) Inventors: Ruijie Shi, Clifton Park, NY (US); Robert Dean King, Schenectady, NY (US); Paul Robert Gemin, Niskayuna, NY (US); Irene Michelle Berry, Schenectady, NY (US); Augusto Espinel Porras, Zurich (CH)

( * ) Notice: Subject to any disclaimer, the term of this patent is extended or adjusted under 35 U.S.C. 154(b) by 840 days.

(21) Appl. No.: 13/305,817

(22) Filed: Nov. 29, 2011

(65) Prior Publication Data

US 2013/0138279 A1    May 30, 2013

(51) Int. Cl.
| | |
|---|---|
| *B60L 11/00* | (2006.01) |
| *B60L 11/18* | (2006.01) |
| *B60L 1/00* | (2006.01) |
| *B60L 7/14* | (2006.01) |

(52) U.S. Cl.
CPC ............ *B60L 11/1862* (2013.01); *B60L 1/00* (2013.01); *B60L 7/14* (2013.01); *B60L 11/005* (2013.01); *B60L 11/1868* (2013.01); *B60L 2210/30* (2013.01); *B60L 2210/40* (2013.01); *B60L 2240/12* (2013.01); *B60L 2240/421* (2013.01); *B60L 2240/423* (2013.01); *B60L 2240/547* (2013.01); *B60L 2240/549* (2013.01); *B60L 2240/642* (2013.01); *B60L 2250/26* (2013.01)

(58) Field of Classification Search
USPC ............................. 701/414, 423; 340/995.13
See application file for complete search history.

(56) References Cited

U.S. PATENT DOCUMENTS

| | | | | |
|---|---|---|---|---|
| 5,345,154 | A * | 9/1994 | King | B60K 6/46 318/139 |
| 5,373,195 | A | 12/1994 | De Doncker et al. | |
| 5,602,459 | A * | 2/1997 | Rogers | B60L 11/1861 320/134 |
| 5,642,270 | A * | 6/1997 | Green | B60L 11/126 363/17 |
| 5,710,699 | A * | 1/1998 | King | B60L 11/005 318/139 |
| 6,048,289 | A * | 4/2000 | Hattori | B60K 6/48 180/65.25 |
| 6,175,805 | B1 * | 1/2001 | Abe | 701/533 |
| 6,331,365 | B1 * | 12/2001 | King | B60L 11/1803 320/103 |

(Continued)

*Primary Examiner* — Jonathan L Sample
(74) *Attorney, Agent, or Firm* — Meagher Emanuel Laks Goldberg & Liao, LLP

(57) ABSTRACT

A vehicular energy management system (EMS) determines a net total power from a traction drive load, an auxiliary device load, and a regenerative power. If the net total power is a net supply power, the EMS causes regenerative power to be provided to a power source and energy source in a controlled manner to initially charge the power source to a desired state-of-charge (SOC) and then subsequently charge the energy source. If the net total power comprises a net power load, the EMS causes power to be drawn from the power source and the energy source, with a split of the power being drawn from the power source and the energy source being based on a magnitude of the net power load. The EMS adjusts/maintains the SOC set-point of the power source and the DC link voltage based on vehicle speed and relative altitude of travel of the vehicle.

24 Claims, 5 Drawing Sheets

(56) References Cited

U.S. PATENT DOCUMENTS

| | | | | |
|---|---|---|---|---|
| 6,832,148 B1* | 12/2004 | Bennett | B60K 6/445 180/65.225 | |
| 9,077,269 B2* | 7/2015 | Nakamura | H02P 6/10 | |
| 2001/0039230 A1* | 11/2001 | Severinsky | B60H 1/004 477/3 | |
| 2005/0080523 A1* | 4/2005 | Bennett | B60K 6/445 701/22 | |
| 2005/0251299 A1* | 11/2005 | Donnelly | B60L 7/08 701/19 | |
| 2005/0258795 A1* | 11/2005 | Choi | B29C 45/7666 318/625 | |
| 2005/0284676 A1* | 12/2005 | King | B60L 7/06 180/65.22 | |
| 2006/0005739 A1* | 1/2006 | Kumar | B60L 7/06 105/35 | |
| 2007/0164693 A1* | 7/2007 | King | B60K 6/28 318/109 | |
| 2008/0121136 A1* | 5/2008 | Mari | B60L 11/02 105/35 | |
| 2009/0243522 A1* | 10/2009 | Suhama | B60L 7/16 318/376 | |
| 2010/0019718 A1* | 1/2010 | Salasoo | B60L 3/0046 320/103 | |
| 2010/0045220 A1* | 2/2010 | Yamada | B60K 6/445 318/400.15 | |
| 2010/0255393 A1* | 10/2010 | Imai | B60L 11/1868 429/428 | |
| 2011/0174561 A1* | 7/2011 | Bowman | B60K 6/46 180/65.245 | |
| 2011/0213517 A1* | 9/2011 | Laws | B60W 10/26 701/22 | |
| 2011/0246013 A1* | 10/2011 | Yee | B60L 11/1859 701/22 | |
| 2012/0038216 A1* | 2/2012 | Berry | B60L 11/005 307/77 | |
| 2013/0274984 A1* | 10/2013 | Justin | B60W 10/26 701/22 | |

* cited by examiner

US 9,290,107 B2

SYSTEM AND METHOD FOR ENERGY MANAGEMENT IN AN ELECTRIC VEHICLE

BACKGROUND OF THE INVENTION

The invention relates generally to hybrid and electric vehicles, and more specifically to a system and method of energy management and optimization of energy storage component usage aboard hybrid and electric vehicles.

Electric vehicles and hybrid electric vehicles are typically powered by one or more energy storage devices, either alone or in combination with an internal combustion engine. In pure electric vehicles, the one or more energy storage devices power the entire drive system, thereby eliminating the need for an internal combustion engine. Hybrid electric vehicles, on the other hand, include energy storage device power to supplement power supplied by an internal combustion engine, which greatly increases the fuel efficiency of the internal combustion engine and of the vehicle. Traditionally, the energy storage devices in electric or hybrid electric propulsion systems include batteries, ultracapacitors, flywheels, superconducting magnetic energy storage devices, or a combination of these elements in order to provide sufficient energy to power an electric motor.

When two or more energy storage devices are used to provide power to the drive system, the energy storage devices are typically well-suited to provide different types of power. A first energy storage device, for example, may be a high specific-power source more efficient at providing short-term power while a second energy storage device may be a high specific-energy storage device that is more efficient or economical at providing long-term power. The high specific-power energy storage device may be used to assist the high specific-energy energy storage device in providing power to the system during, for example, acceleration or pulsed load events.

It is desirable in such dual energy storage device arrangements to provide load-leveling functionality so as to reduce transient loading to the devices. However, prior art energy storage device arrangements generally operate with limited or no information about the environment and vehicle usage and lack a sophisticated control scheme. This often results in sub-optimal usage of the energy storage devices that can shorten life because of unnecessary applied stresses, with efficiencies of the energy storage devices not being optimized during charging and discharging events. Additionally, energy storage devices are over-sized for the application to ensure that stress limits are not exceeded, which adds cost to the system.

It would therefore be desirable to have a system and method capable of optimizing the usage and flow of energy from and to energy storage devices in an electric or hybrid power system.

BRIEF DESCRIPTION OF THE INVENTION

Embodiments of the invention are directed to system and method for energy storage component optimization that overcome the aforementioned drawbacks.

According to an aspect of the invention, a system includes a vehicle and a power system onboard the vehicle configured to provide power to drive the vehicle, with the power system further including a traction drive including an inverter and an AC motor, a direct current (DC) link electrically coupled to the traction drive, a first energy storage device (ESD) comprising a high specific-power energy storage device that electrically coupled to the traction drive to provide power thereto, and a second energy storage device (ESD) comprising a high specific-energy energy storage device that is electrically coupled to the traction drive to provide power thereto. The system also includes an energy management system (EMS) configured to determine a net total power of the vehicle as a sum of a traction drive load demand, an auxiliary device load demand, and a regenerative power provided by regenerative braking of the traction drive, and cause regenerative power to be provided to each of the first ESD and the second ESD if the net total power comprises a net supply power, with providing of the net supply power being controlled so as to initially charge the first ESD to a desired state-of-charge (SOC) and subsequently charge the second ESD. The EMS is further configured to cause power to be drawn from the first ESD and the second ESD if the net total power comprises a net power load, with a split of the power being drawn from the first ESD and the second ESD being based on a magnitude of the net power load, maintain a desired voltage on the DC link based on a speed of the AC motor, and maintain a desired SOC of the first ESD based on a speed and a relative altitude or slope of travel of the vehicle.

According to another aspect of the invention, a system for optimizing energy storage component usage in a vehicle comprising one of a hybrid vehicle, a plug-in hybrid vehicle, and an electric vehicle is provided. The system includes an energy management system (EMS) programmed to determine a net total power of the vehicle from a combination of an inverter load demand for driving a traction drive, an auxiliary load demand, and a regenerative power provided by regenerative braking of the traction drive, determine if the net total power comprises a net supply power or a net power load, and if the net total power comprises a net supply power, then cause the net supply power to be provided to each of a power source and an energy source in the vehicle that provide traction power, wherein the net supply power is first supplied to the power source so as to bring the power source to a state-of-charge (SOC) set-point and is then subsequently supplied to the energy source. If the net total power comprises a net power load, then the EMS is programmed to compare the net power load to at least one power load threshold, control a drawing of power from the power source and the energy source to meet the inverter and auxiliary load demands, with an amount of power being drawn from each of the power source and the energy source being based on the comparison of the net power load to the at least one power load threshold, maintain a desired voltage on a DC link in the vehicle based on a speed of a motor in the traction drive, and maintain the power source at the SOC set-point, which is adjusted based on a speed of the vehicle and an altitude and grade of terrain the vehicle is traveling on.

According to another aspect of the invention, a method for optimizing energy storage component usage in a vehicle having a high specific-power energy storage device and a high specific-energy energy storage device coupled to a traction drive by way of a direct current (DC) link is provided. The method includes determining a desired operating voltage for the DC link in the vehicle based on a speed of a motor in the traction drive, determining a state-of-charge (SOC) set-point for the high specific power energy storage device (ESD) based on a speed of the vehicle and an altitude of the road being traveled by the vehicle, and determining a power state of the vehicle based on a summation of a traction drive load demand, an auxiliary device load demand, and a regenerative power supply provided by regenerative braking of the traction drive, the power state comprising one a net power supply or a net power load. The method also includes selectively providing a charging power to the high specific-power ESD and the high specific-energy ESD if the vehicle has a net power supply, wherein charging power is provided so as to initially charge the high specific-power ESD to the determined SOC set-point before charging the high specific-energy ESD, and selectively drawing power from the high specific-power ESD and the high specific-energy ESD if the vehicle has a net power load, wherein power is drawn from one of, or split between, the high specific-power ESD and the high specific-energy ESD based on a magnitude of the net power load.

Various other features and advantages will be made apparent from the following detailed description and the drawings.

BRIEF DESCRIPTION OF THE DRAWINGS

The drawings illustrate one or more embodiments of the invention.

In the drawings.

DETAILED DESCRIPTION

The invention includes embodiments that relate to optimization of energy storage component usage. The invention includes embodiments that relate to systems and methods of energy management and optimization of energy storage component usage for a vehicle. The invention is described with respect to a multi-energy storage electric vehicle. The embodiments and methods illustrated herein may also be applied to hybrid vehicles, range extended electric vehicles, plug-in hybrid electric vehicles (PHEV), and the like. The embodiments and methods illustrated herein may be broadly applied to passenger and commercial vehicles as well as to locomotives, off-highway vehicles, roller coaster systems, ships and planes. It should also be understood that a vehicular implementation is only one of many uses for this technology. Any system containing power generation, consumption, and energy storage components is a candidate for incorporating embodiments of the invention.

Figure 1:
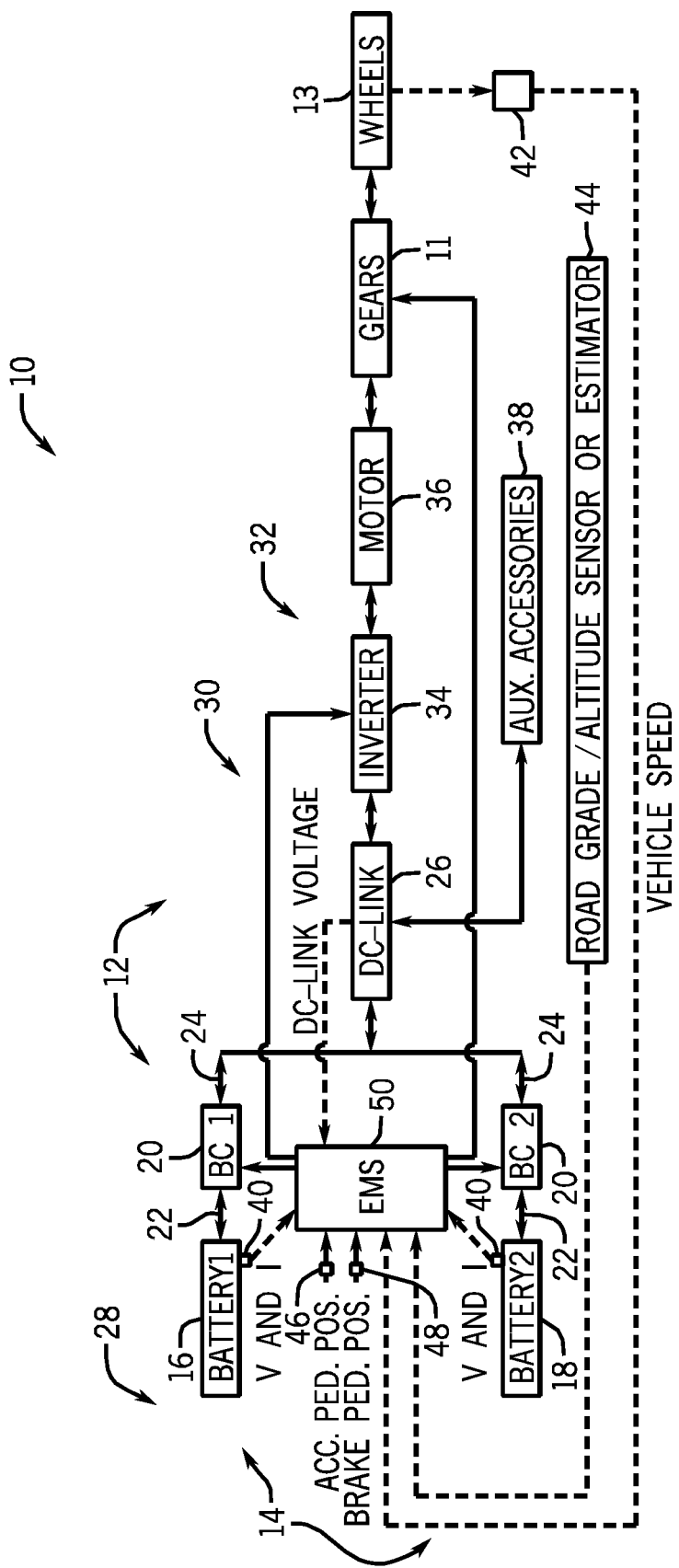
FIG. 1 is a schematic diagram of a vehicle including a propulsion system and energy management system according to an embodiment of the invention, where two types of energy storage devices are connected to a DC link through booster converters.

FIG. 1 illustrates a block schematic diagram of a vehicle 10 incorporating an embodiment of the invention. Vehicle 10 includes a propulsion system 12 (i.e., power system) configured to impart power to a transmission or differential gears 11 and wheels 13 of the vehicle. The propulsion system 12 may be used in electric or hybrid vehicle applications. The vehicle propulsion system 12 includes an energy storage system 14 that, according to an exemplary embodiment of the invention, is configured as a dual energy storage system that includes a first energy storage device (ESD) 16 and a second energy storage device (ESD) 18. In the present embodiment, first ESD 16 is a high-specific power device (battery, ultracapacitor or other device), referred to hereafter as a "power source" (PS) or "power battery", and second ESD 18 is a high-specific energy battery (or other energy storage device), referred to hereafter as an "energy source" (ES) or "energy battery".

According to an embodiment of the invention, power source 16 may be, for example, a high performance lithium-ion battery having a high specific-power rating (e.g., having a power density of 350 W/kg or greater). Alternatively, power source 16 may be an ultracapacitor, with the ultracapacitor representing a capacitor comprising multiple capacitor cells coupled to one another, where the capacitor cells may each have a capacitance that is greater than 500 Farads. The energy source 18 is a high specific (gravimetric) energy battery or high energy density battery demonstrated to achieve an energy density on the order of 100 W-hr/kg or greater (e.g., a Li-ion, sodium-metal halide, sodium nickel chloride, sodium-sulfur, or zinc-air battery). The energy source 18 may also be a relatively high impedance, low specific-power battery. Using a relatively high impedance, low specific-power battery instead of a low impedance, high specific-power battery results in a lower-cost electric propulsion system.

The propulsion system 12 also includes bi-directional DC-DC voltage converters (i.e., "boost converters") 20 coupled to the power source 16 and the energy source 18. The boost convertors 20 have an input channel 22 coupled to power source 16 and energy source 18, respectively, and have an output channel 24 coupled to a DC link 26. During typical operation, boost converters 20 act to boost the voltage provided by a low-voltage side 28 of propulsion system 12 to a high-voltage side 30 of propulsion system 12, such as by a boost ratio typically greater than 1.0 (e.g., 2:1), as well as to regulate the voltage and provide over-current protection to power source 16 and energy source 18. As shown in FIG. 1, the power source 16 and energy source 18 are thus coupled through boost converters 20 and DC link 26 to a load 32, which, according to an embodiment of the invention, is an electric traction drive including a DC-AC inverter 34 and one or more motors or electromechanical devices 36. The motor 36 is preferably an AC motor but is not limited as such.

As further shown in FIG. 1, vehicle 10 includes auxiliary accessories 38 that are powered through DC link 26. Accessories 38 may include, but are not limited to, an air conditioning/heating system, a radio, and a vehicle lighting system. The auxiliary power load 38 may connect to one of the energy storage devices 16, 18 directly in some applications. Additionally, vehicle 10 includes a plurality of sensors that collect data relating to vehicle operation. The plurality of sensors includes sensors for measuring voltage and current of the power source 16 and energy source 18 to determine and monitor a state-of-charge (SOC) of the power source 16 and energy source 18, or their output/input power flows. The plurality of sensors also includes sensors 42, 44 for measuring the speed of the vehicle and the altitude and road grade/slope of terrain that the vehicle is traveling on, respectively, for purposes of determining a kinetic energy and gravity potential energy of the vehicle 10. The plurality of sensors can also include sensors 46, 48 configured to measure acceleration pedal position and brake pedal position, to provide for determination of motor torque and speed.

Figure 2:
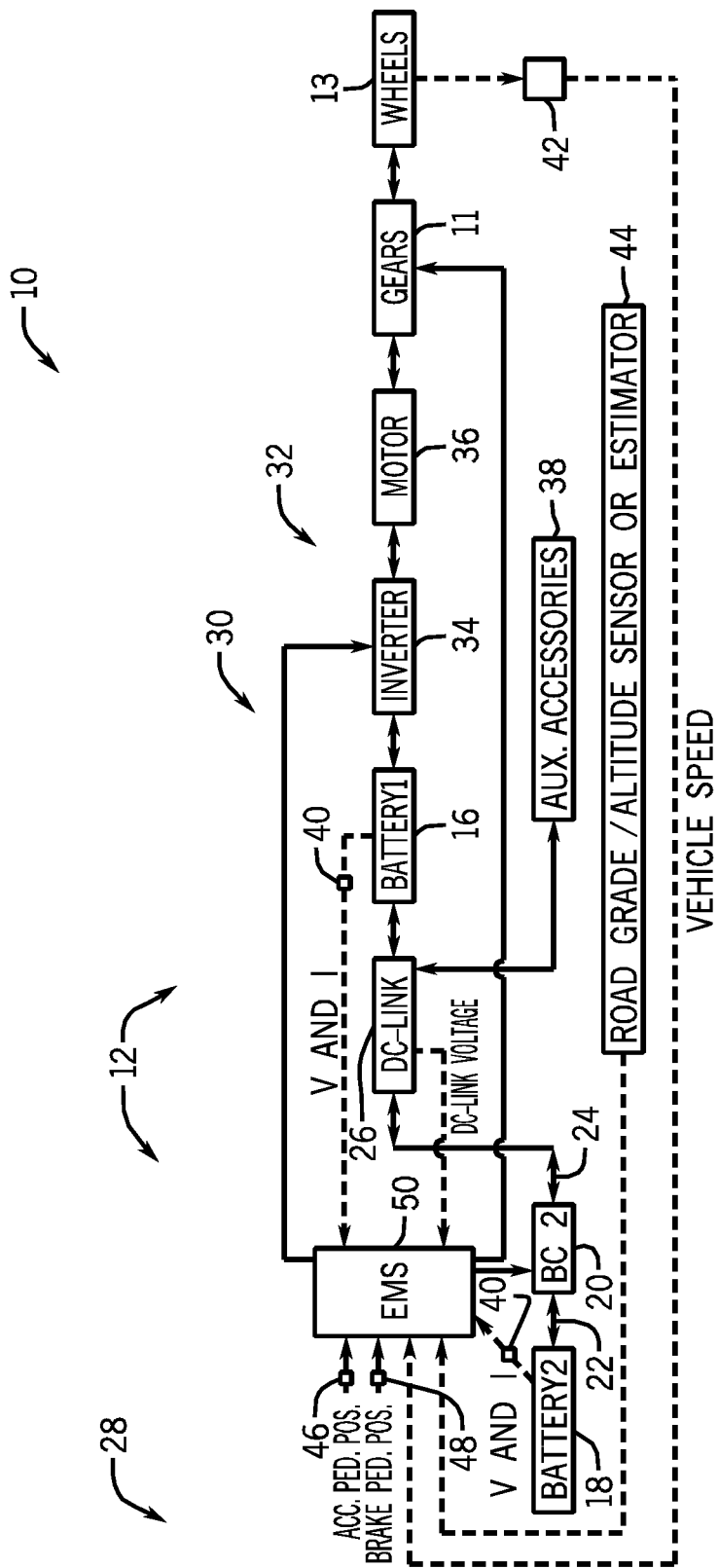
FIG. 2 is a schematic diagram of a vehicle including a propulsion system and energy management system according to another embodiment of the invention where one type of energy storage device is connected directly to a DC link.

Referring now to FIG. 2, a block schematic diagram of vehicle 10 is shown according to another embodiment of the invention. Vehicle 10 includes a propulsion system 12 (i.e., power system) configured to impart power to gears 11 and wheels 13 of the vehicle. The vehicle propulsion system 100 includes a power source 16 and an energy source 18. According to an embodiment of the invention, the power source 16 may be, for example, a high performance lithium-ion battery having a high specific-power rating (e.g., having a power density of 350 W/kg or greater) or an ultracapacitor with capacitor cells that each have a capacitance that is greater than 500 Farads. The energy source 18 is a high specific energy battery or high energy density battery demonstrated to achieve an energy density on the order of 100 W-hr/kg or greater (e.g., a Li-ion, sodium-metal halide, sodium nickel chloride, sodium-sulfur, or zinc-air battery).

As shown in FIG. 2, power source 16 is directly coupled to DC link 26 on high-voltage side 30 of propulsion system 12. Energy source 18 is positioned on a low-voltage side 28 of propulsion system 12 and is coupled to a bi-directional DC-DC voltage converter 20 (i.e., "boost converter"). The boost converter 20 has an input channel 22 coupled to energy source 18 and an output channel 24 coupled to DC link 26. During typical operation, boost converter 20 acts to boost the voltage provided by the low-voltage side 28 of propulsion system 12 to the high-voltage side 30 of propulsion system 12, as well as to regulate the voltage and provide over-current protection to energy source 18. The power source 16 and energy source 18 provide power to a load that includes an electric traction drive 32 having a DC-AC inverter 34 and one or more motors or electromechanical devices 36.

As shown in each of FIGS. 1 and 2 embodiments of the propulsion systems of vehicle 10 also include an energy management system (EMS) 50 that, according to embodiments of the invention, is integrated into a computer or control system on vehicle 10. The EMS 50 is configured to dynamically control the energy and power levels provided to and drawn from the power source 16, energy source 18, fraction drive 32 and auxiliary load 38. The EMS 50 also controls the voltage and power present on the DC link 26 and sets a state-of-charge (SOC) of power source 16 at a desired set-point during operation of propulsion system 12, with the EMS 50 dynamically adjusting the SOC set-point of the power source 16 based on vehicle operation. The EMS 50 functions to adaptively control the power source 16 and energy source 18 power levels based on parameters such as vehicle speed, AC traction drive torque demand, AC traction drive speed, vehicle altitude, road grade, and based on various electrical characteristics of the energy storage devices, such as a SOC of the power source 16. For example, during typical vehicle acceleration, such dynamic control of EMS 50 enables independent control of the amount of energy supplied by power source 16 and/or energy source 18, such as by independently controlling bi-directional boost converter(s) 20. Likewise, during deceleration, the EMS 50 operates to control the amount of regenerated energy provided to power source 16 and energy source 18 to maximize the overall charge acceptance of the system. Such dynamic control greatly improves the overall efficiency of propulsion system 12.

In controlling the energy levels provided to and drawn from the power source 16 and energy source 18, the EMS 50 is configured to set a SOC of power source 16 at a desired set-point or value during operation of propulsion system 12 and dynamically adjusting the SOC set-point based on vehicle operation. According to an embodiment of the invention, the EMS 50 may initially set the SOC set-point of power source 16 at a mid-range value (e.g., such as at a value between 40 and 80 percent SOC), so as to allow stored energy to be used during acceleration events and to allow regenerative braking energy to be stored therein, for example. The EMS 50 is configured to adjust the SOC set-point of the power source 16 based on the vehicle speed and either the relative altitude of the vehicle or a road grade on which the vehicle is traveling. The EMS 50 determines a kinetic energy and gravity potential energy of the vehicle 10 based on the speed and altitude/road grade of the vehicle 10, respectively, with the SOC set-point of the power source 16 then being adjusted by an amount that is proportional to the sum of the vehicle kinetic and gravity potential energy change.

Thus, when the vehicle 10 has a high speed or high altitude (i.e., descending road grade), the SOC set-point of the power source 16 is adjusted downward so as to be set to a relatively lower level, so as to reserve a corresponding capacity for receiving regenerative power from the future vehicle deceleration or down slope driving. Conversely, when the vehicle has a low speed and altitude (i.e., ascending road grade), the SOC set-point of the power source 16 is adjusted upward so as to be set to a relatively higher level, so as to reserve a corresponding capacity for power load demands from future vehicle acceleration or up slope driving. Adjustment of the SOC of the power source 16 to reach the adjusted SOC set-point can then be achieved by operating the traction motor 36 in a motoring or traction mode (to decrease the SOC) or by charging power source 16 (to increase the SOC). Adjustment of the SOC set-point of the power source 16 thus addresses major causes of the transient power load such as the vehicle speed and altitude variations, which, from the energy perspective, are conversions between electric energy and vehicle kinetic energy or gravity potential energy, and thus enables more efficient use of power from the power source 16 and energy source 18 and the use of regenerative power by regenerative braking In controlling the voltage level on the DC link 26 during operation of vehicle 10, the EMS 50 functions to maintain the voltage and power of DC link 26 at a determined minimum level. That is, the EMS 50 controls the power and voltage levels on the DC link 26 as a function of motor speed, with the EMS 50 setting a lower limit for the DC-link voltage when the motor speed is high and the EMS 50 increasing the DC link voltage as the motor speed increases. By controlling the voltage and power of the DC link 26 at a minimum level, the EMS 50 ensures that, even at high speed, the vehicle 10 will still have sufficient torque capability for any additional requested acceleration, so as to guaranty the vehicle performance at high speed.

Figure 3:
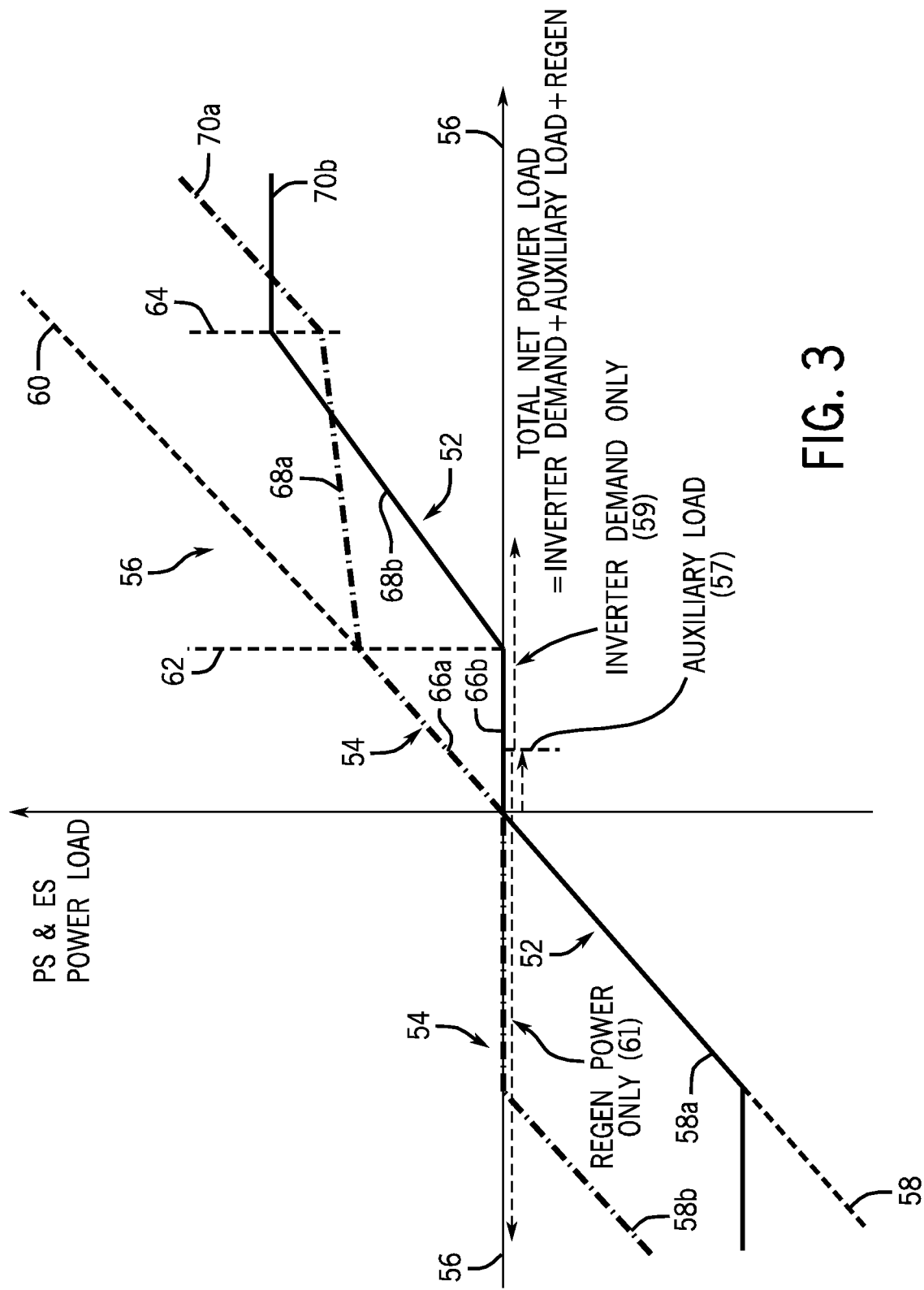
FIGS. 3 and 4 are plots showing a power splitting arrangement between a power source and an energy source of the vehicles of FIGS. 1 and 2 according to an embodiment of the invention.
Figure 4:
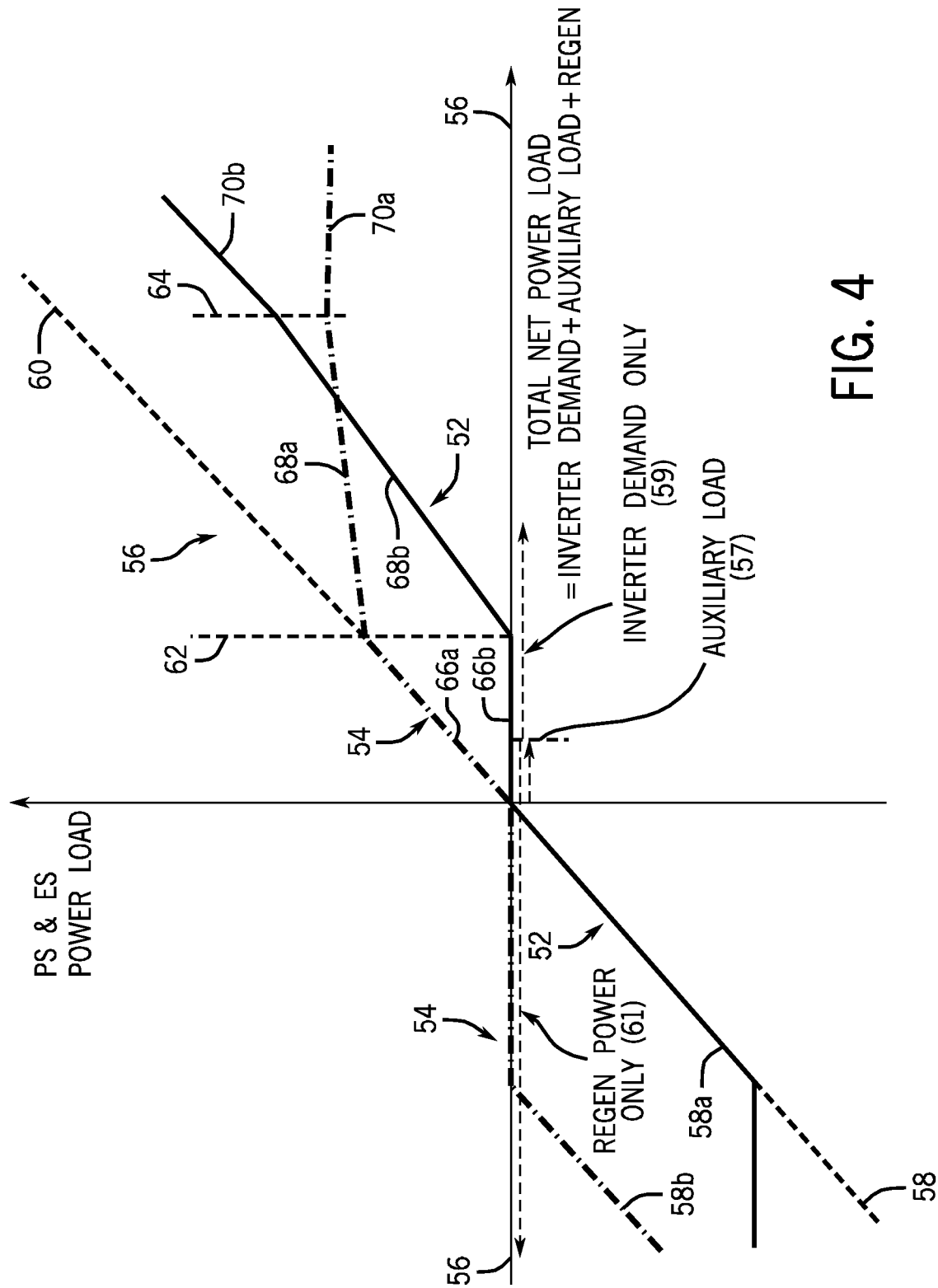

Referring now to FIGS. 3 and 4, and with continued reference to FIGS. 1 and 2, graphs illustrate the functioning of EMS 50 to dynamically control the power levels provided to and drawn from the energy storage devices 16, 18, according to embodiments of the invention. As shown in FIGS. 3 and 4, the power levels provided to and drawn from the power source 16 and energy source 18 are indicated by lines 52 and 54 respectively, and are controlled by the EMS by determining and monitoring a net total power 56 of the vehicle. In determining the net total power 56 of the vehicle, the EMS 50 receives inputs on a traction drive load demand, an auxiliary device load demand, and a regenerative power provided by regenerative braking of the traction drive 32. The EMS 50 determines a sum of the traction drive load demand, auxiliary device load demand, and regenerative power to determine if the net total power 56 is a net supply power or a net power load. In FIGS. 3 and 4, the summation of the powers is shown as the total net power 56, also as the net supply power 58 or the net power load 60.

As indicated in FIGS. 3 and 4, the EMS 50 determines the net total power 56 of the vehicle 10 by summing the auxiliary device load demand 57 (the amount from zero to line 57), the traction drive load demand 59 (from line 57 positive onward, with inverter demand only at its input port and power losses of boost converters), and the regenerative power 61 (from line 57 negative onward). Summation of the three powers will be the total net power 56, comprising of the net supply power 58 and the net power load 60. This counting of the regenerative power into the net total power 56 enables utilization of the regenerative power to first meet the auxiliary load demand, before providing a remainder of regenerative power for charging of the power source 16 and energy source 18. As shown in FIGS. 3 and 4, if the regenerative power is smaller than (i.e., cannot meet) the auxiliary power demand, the total net power 56 is still a net power load. If the regenerative power is more than the auxiliary power demand, a portion of the regenerative power needs to supply the auxiliary power load, and the extra regenerative power shows as the total net power.

If the regenerative power is greater than a sum of the traction drive load demand and the auxiliary load demand, then it is determined that there is a net supply power 58. As the regenerative power has a negative sign in determining the net total power 56, and as the regenerative power is greater than a sum of the traction drive load demand and the auxiliary load demand when there is a net supply power 58, the net supply power 58 is indicated in FIGS. 3 and 4 in the quadrant where power values on both the x and y axes are negative. When there is a net supply power 58, the EMS 50 functions to selectively control providing of the regenerative power to the energy storage devices 16, 18 so as to provide charging thereto. The EMS 50 controls the supplying of the net supply power 58 such that the power source 16 is first charged to its desired SOC (the power source typically has a higher charging efficiency) and the energy source 18 is then subsequently charged. The prioritized charging of the power source 16 to its SOC set-point by the net supply power 58 is indicated at 58*a*, with the subsequent charging of energy source 18 being indicated at 58*b*. In the case that the power source and the energy source have very similar charging and discharging characteristics, when it is determined by the EMS that the net total power 56 is a net supply power 58, the EMS 50 functions to selectively split the net supply power 58 so that the power source 16 and energy source 18 have similar charging efficiencies, while satisfying their respective power limits and energy management priorities.

Conversely, if the sum of the traction drive load demand and the auxiliary load demand is greater than the regenerative power, then it is determined that there is a net power load, such that the traction drive is operated in propulsion mode. As the traction drive load demand and auxiliary device load demand have a positive sign in determining the net total power 56, and as a sum of the traction drive load demand and auxiliary device load demand is greater than the regenerative power when there is a net power load 60, the net power load 60 is indicated in FIGS. 3 and 4 in the quadrant where power values on both the x and y axes are positive. When there is a net power load 60, the net power load 60 is split into portions for the energy source 18 and power source 16, respectively, so that the energy source 18 discharge efficiency is roughly close to the round-trip efficiency (i.e., the product of efficiencies for charging and discharging) of the power source 16, while satisfying respective power limit constraints. This splitting of the net power load 60 leads to optimal system energy utilization.

In operation, the EMS 50 splits the net power load 60 drawn between the power source 16 and energy source 18, again indicated by lines 52 and 54 respectively, based on a magnitude of the net power load 60. That is, the EMS 50 compares the net power load 60 to a plurality of power load thresholds, with the splitting of the power drawn from each of the power source 16 and the energy source 18 being based on the comparison of the net power load 60 to the power load thresholds. As shown in FIGS. 3 and 4, according to one embodiment of the invention, a first power load threshold 62 and a second power load threshold 64 are defined for purposes of splitting the range of the net power load 60. If a magnitude of the net power load 60 is determined to be below the first power load 62 threshold, then the EMS 50 causes power to be drawn only from the energy source 18 to meet the net power load with zero power being drawn from the power source 16, as indicated by segments 66*a* and 66*b* of the energy source load line 54 and power source load line 52, respectively. If a magnitude of the net power load 60 is determined to be between the first power load threshold 62 and the second power load threshold 64, then the EMS 50 causes extra power (beyond the first power load threshold) to be split between the energy source 18 and the power source 16, with the percentage of power being drawn from the power source 16 typically increasing faster than that from the energy source 18 as the net power load 60 approaches the second power load threshold 64, as indicated by segments 68*a* and 68*b* of the energy source load line 54 and power source load line 52, respectively.

If a magnitude of the net power load 60 is determined to be above the second power load threshold 64, then the EMS 50 causes a max power to be drawn from one of the power source 16 and the energy source 18, i.e., up to a maximum power limit of the power source 16 or energy source 18, with the additional power needed to meet the net power load 60 being drawn from the other of the power source 16 or energy source 18. According to one embodiment, and as shown in FIG. 3, if a magnitude of the net power load 60 is determined to be above the second power load threshold 64, then the EMS 50 causes power to be drawn from the power source 16 up to a maximum power limit of the power source 16, with the additional power needed to meet the net power load 60 being drawn from the energy source 18, as indicated by segments 70*b* and 70*a* of the power source load line 52 and energy source load line 54, respectively. According to another embodiment, and as shown in FIG. 4, if a magnitude of the net power load 60 is determined to be above the second power load threshold, then the EMS 50 causes power to be drawn from the energy source 18 up to a maximum power limit of the energy source 18, with the extra power needed to meet the net power load 60 being drawn from the power source 16, as indicated by segments 70*a* and 70*b* of the energy source load line 54 and power source load line 52, respectively.

According to additional embodiments of the invention, it is recognized that the split of the power to be drawn from and provided to the power source 16 and the energy source 18 can be skewed/adjusted by EMS 50 based on additional considerations. For example, with respect to the controlling of energy levels provided to and drawn from the power source 16 and energy source 18 performed by EMS 50, the EMS may skew/adjust the splitting of the power based on efficiency curves and life cycle costs of the power source 16 and energy source 18, with it being recognized that the splitting can be nonlinear (i.e., a curve instead of straight line).

Figure 5:
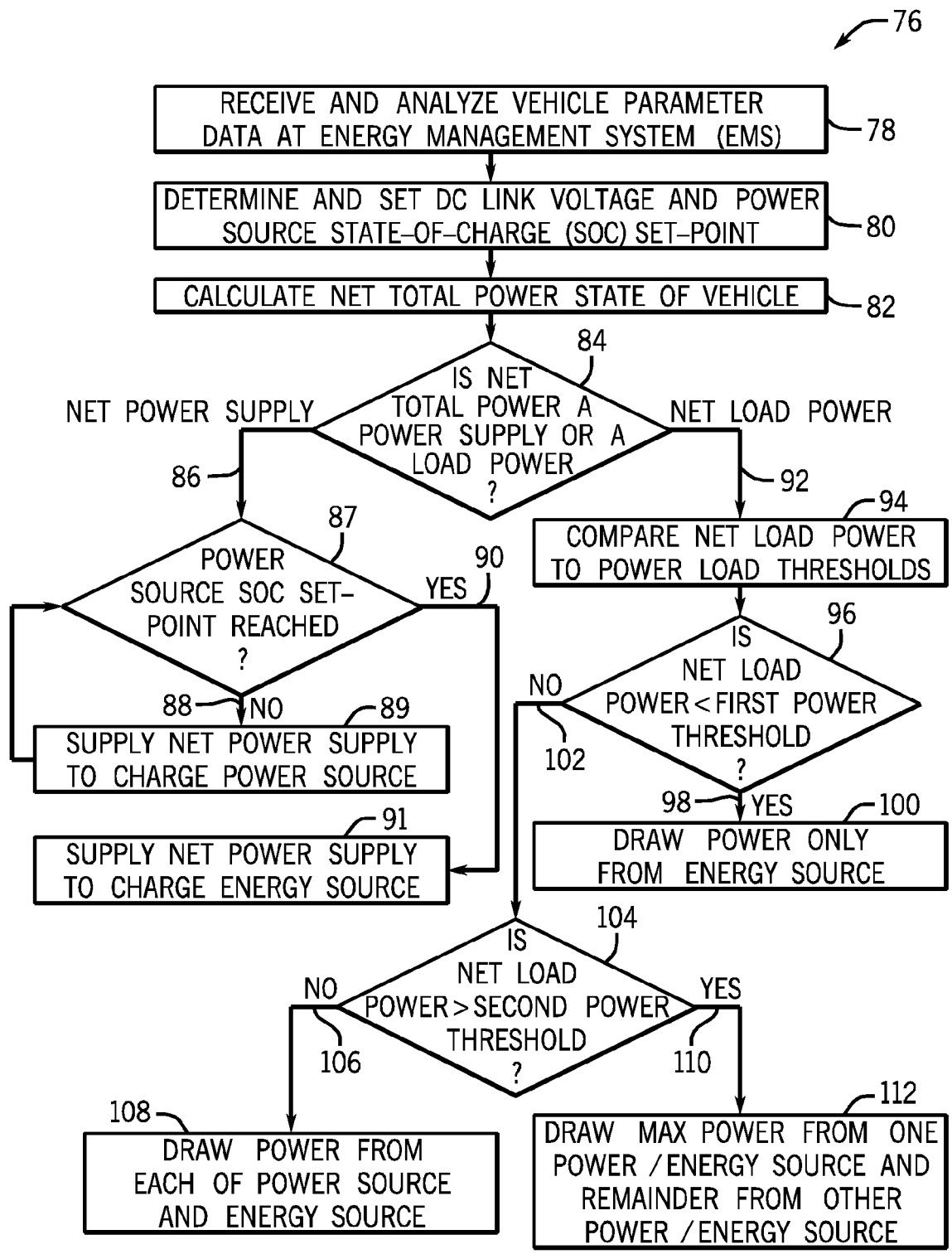
FIG. 5 is a flowchart showing a technique for managing and optimizing energy storage and usage in a power source and an energy source according to an embodiment of the invention.

Referring now to FIG. 5, and with reference back to FIGS. 1 and 2, a computer implemented technique 76, such as implemented by EMS 50, for optimizing energy storage device usage in a vehicle having a high specific-power energy storage device and a high specific-energy energy storage device, i.e., power source 16 and energy source 18, is illustrated according to an embodiment of the invention. Technique 76 begins by providing input data to the EMS 50 at STEP 78 that is representative of an operating state of vehicle and of the current use of the vehicle. For example, data on the voltage and current of the power source 16 and energy source 18, the speed of the vehicle, the altitude and road grade/slope of terrain (measured or estimated) that the vehicle is traveling on, acceleration pedal position, and brake pedal position, can all be provided to EMS 50.

Based on portions of the received data, EMS 50 determines and sets a desired operating voltage for the DC link in the vehicle and a SOC set-point for the power source at STEP 80. More specifically, the EMS determines a desired operating voltage and power for the DC link based on a speed of the vehicle and a SOC set-point for the power source based on a speed of the vehicle and a grade of the road being traveled by the vehicle (i.e., relative altitude). With respect to determining/setting the DC link voltage, the EMS 50 controls the power and voltage levels on the DC link 26 as a function of motor speed, with the EMS 50 setting a lower limit for the DC-link voltage when the motor speed is high (i.e., the motor speed is high) and the EMS 50 increasing the DC link voltage as the motor speed increases, so as to ensure that, even at high speed, the vehicle 10 will still have sufficient torque capability for any additional requested acceleration, so as to guaranty the vehicle performance at high speed. With respect to determining/setting the SOC set-point of power source 16, the EMS 50 determines a kinetic energy and gravity potential energy of the vehicle 10 based on the speed and altitude/road grade of the vehicle 10, respectively, with the SOC set-point of the power source 16 then being adjusted by an amount that is proportional to the sum of the vehicle kinetic and gravity potential energy change. Thus, when the vehicle 10 has a high speed and/or high altitude (i.e., descending road grade), the SOC set-point of the power source 16 is adjusted downward so as to be set to a relatively lower level, so as to reserve a corresponding capacity for receiving regenerative power from the future vehicle deceleration or down slope driving. Conversely, when the vehicle has a low speed and altitude (i.e., ascending road grade), the SOC set-point of the power source 16 is adjusted upward so as to be set to a relatively higher level, so as to reserve a corresponding capacity for power load demands from future vehicle acceleration or up slope driving.

In optimizing usage of power source 16 and energy source 18, technique 76 controls the split of the power to be drawn from and provided to the power source 16 and the energy source 18 by calculating a net total power state of the vehicle at STEP 82. In calculating the net total power of the vehicle at STEP 82, the EMS 50 receives inputs on a traction drive load demand, an auxiliary device load demand, and a regenerative power provided by regenerative braking of the traction drive 32, and sums the loads and the regenerative power.

The EMS 50 then makes a determination at STEP 84 as to whether the net total power comprises a net supply power or a net power load. That is, it is determined at STEP 84 if the regenerative power is greater than a sum of the traction drive load demand and the auxiliary load demand (i.e., case of net supply power) or if the sum of the traction drive load demand and the auxiliary load demand is greater than the regenerative power (i.e., case of net power load). If it is determined that the regenerative power is greater than a sum of the fraction drive load demand and that a net supply power is thus present, indicated at 86, the EMS 50 functions to selectively control providing of the regenerative power to the energy storage devices 16, 18 so as to provide charging thereto. At STEP 87, a determination is first made regarding whether the power source 16 is at a designated SOC set-point. If it is determined that the power source 16 is not at its designated SOC set-point, indicated at 88, then the EMS 50 prioritizes the supplying of the net supply power 58 such that the power source 16 is first charged to its determined SOC set-point. at STEP 89. Technique 76 then loops back to STEP 86 where it is again determined whether the power source 16 is at its designated SOC set-point. Once it is determined that the power source 16 is at its designated SOC set-point, indicated at 90, then, the EMS 50 causes the remaining net supply power 58 to be subsequently provided to the energy source 18 for charging at STEP 91. In special configurations, splitting the net supply power to the power source 16 and the energy source 18 can also be an option. Thus, when it is determined by the EMS that net total power 56 is a net supply power 58, the EMS 50 functions to selectively split the net supply power 58 so that the power source 16 and energy source 18 have similar charging efficiencies, while satisfying their respective power limits and energy management priorities.

If it is determined at STEP 84 that the sum of the traction drive load demand and the auxiliary load demand is greater than the regenerative power and that a net power load is thus present, indicated at 92, the EMS 50 functions to selectively control draw power from the energy storage devices 16, 18 to meet the demanded net power load. At STEP 94, a magnitude of the net power load is compared to a plurality of power load thresholds, with the splitting of the power drawn from each of the power source 16 and the energy source 18 being based on the comparison of the net power load to the power load thresholds.

According to one embodiment of the invention, a first power load threshold and a second power load threshold are defined for purposes of splitting the drawing of the net power load between the energy source 18 and the power source 16. At STEP 96, a determination is made as to whether the magnitude of the net power load is determined to be below the first power load threshold. If it is determined that the net power load is below the first power load threshold, indicated at 98, then the technique continues at STEP 100 with the EMS 50 causing power to be drawn only from the energy source 18 to meet the net power load, with zero power being drawn from the power source 16. If it is determined that the net power load is not below the first power load threshold, indicated at 102, then the technique continues to STEP 104 where a determination is made as to whether the magnitude of the net power load is determined to be above the second power load threshold. If it is determined that the net power load is not above the second power load threshold, indicated at 106, then it is determined that the magnitude of the net power load 60 falls between the first power load threshold and the second power load threshold. The technique thus continues at STEP 108 with the EMS 50 causing power to be drawn from each of the energy source 18 and the power source 16 to meet the extra power demand beyond the first power load threshold, with the percentage of power being drawn from the power source 16 increasing as the net power load approaches the second power load threshold. Finally, if it is determined that the net power load is greater than the second power load threshold, indicated at 110, then the technique continues at STEP 112 with the EMS 50 causing a max power to be drawn from one of the power source 16 and the energy source 18, i.e., up to a maximum power limit of the power source 16 or energy source 18, with the additional power needed to meet the net power load being drawn from the other of the power source 16 or energy source 18. According to one embodiment, at STEP 112, the EMS 50 causes power to be drawn from the power source 16 up to a maximum power limit of the power source 16, with the additional power needed to meet the net power load being drawn from the energy source 18. According to another embodiment, at STEP 112, the EMS 50 causes power to be drawn from the energy source 18 up to a maximum power limit of the power source 16, with the extra power needed to meet the net power load 60 being drawn from the power source 16.

Thus, according to STEPS 94-112 of technique 76, when there is a net power load, the net power load is split into portions for the energy source 18 and power source 16, respectively, so that the energy source 18 discharge efficiency is roughly close to the round-trip efficiency (i.e., the product of efficiencies for charging and discharging) of the power source 16, while satisfying respective power limit constraints. This splitting of the net power load leads to optimal system energy utilization.

Embodiments of the invention thus provide for efficient energy management and usage of energy storage device devices of electric and hybrid power systems by way of an energy management system. By selectively and dynamically controlling the energy levels provided to and drawn from energy storage device devices of a vehicle, such as high specific-power and high specific-energy storage devices, system efficiency can be increased. Accordingly, the size and rating of energy storage devices can be lowered so as to allow for a cost reduction achieved through a smaller energy storage device and through increasing device life cycle due to lower life-impacting stresses thereof such as high current charging and discharging. Additionally, by selectively controlling the energy levels provided to and drawn from energy storage device devices via the energy management system, shuffling/switching between the energy storage devices can be minimized and high load demands can be split between the energy storage devices so as to reduce stress thereon.

A technical contribution for the disclosed system and method is that it provides for a computer-implemented technique for selectively and dynamically controlling the energy levels provided to and drawn from energy storage device devices of a vehicle, such as high specific-power and high specific-energy storage devices, so as to optimize system efficiency.

Therefore, according to an embodiment of the invention, a system includes a vehicle and a power system onboard the vehicle configured to provide power to drive the vehicle, with the power system further including a traction drive including an inverter and an AC motor, a direct current (DC) link electrically coupled to the traction drive, a first energy storage device (ESD) comprising a high specific-power energy storage device that electrically coupled to the traction drive to provide power thereto, and a second energy storage device (ESD) comprising a high specific-energy energy storage device that is electrically coupled to the traction drive to provide power thereto. The system also includes an energy management system (EMS) configured to determine a net total power of the vehicle as a sum of a traction drive load demand, an auxiliary device load demand, and a regenerative power provided by regenerative braking of the traction drive, and cause regenerative power to be provided to each of the first ESD and the second ESD if the net total power comprises a net supply power, with providing of the net supply power being controlled so as to initially charge the first ESD to a desired state-of-charge (SOC) and subsequently charge the second ESD. The EMS is further configured to cause power to be drawn from the first ESD and the second ESD if the net total power comprises a net power load, with a split of the power being drawn from the first ESD and the second ESD being based on a magnitude of the net power load, maintain a desired voltage on the DC link based on a speed of the AC motor, and maintain a desired SOC of the first ESD based on a speed and a relative altitude or slope of travel of the vehicle.

According to another embodiment of the invention, a system for optimizing energy storage component usage in a vehicle comprising one of a hybrid vehicle, a plug-in hybrid vehicle, and an electric vehicle is provided. The system includes an energy management system (EMS) programmed to determine a net total power of the vehicle from a combination of an inverter load demand for driving a traction drive, an auxiliary load demand, and a regenerative power provided by regenerative braking of the traction drive, determine if the net total power comprises a net supply power or a net power load, and if the net total power comprises a net supply power, then cause the net supply power to be provided to each of a power source and an energy source in the vehicle that provide traction power, wherein the net supply power is first supplied to the power source so as to bring the power source to a state-of-charge (SOC) set-point and is then subsequently supplied to the energy source. If the net total power comprises a net power load, then the EMS is programmed to compare the net power load to at least one power load threshold, control a drawing of power from the power source and the energy source to meet the inverter and auxiliary load demands, with an amount of power being drawn from each of the power source and the energy source being based on the comparison of the net power load to the at least one power load threshold, maintain a desired voltage on a DC link in the vehicle based on a speed of a motor in the traction drive, and maintain the power source at the SOC set-point, which is adjusted based on a speed of the vehicle and an altitude and grade of terrain the vehicle is traveling on.

According to another embodiment of the invention, a method for optimizing energy storage component usage in a vehicle having a high specific-power energy storage device and a high specific-energy energy storage device coupled to a traction drive by way of a direct current (DC) link is provided. The method includes determining a desired operating voltage for the DC link in the vehicle based on a speed of a motor in the traction drive, determining a state-of-charge (SOC) set-point for the high specific power energy storage device (ESD) based on a speed of the vehicle and an altitude of the road being traveled by the vehicle, and determining a power state of the vehicle based on a summation of a traction drive load demand, an auxiliary device load demand, and a regenerative power supply provided by regenerative braking of the traction drive, the power state comprising one a net power supply or a net power load. The method also includes selectively providing a charging power to the high specific-power ESD and the high specific-energy ESD if the vehicle has a net power supply, wherein charging power is provided so as to initially charge the high specific-power ESD to the determined SOC set-point before charging the high specific-energy ESD, and selectively drawing power from the high specific-power ESD and the high specific-energy ESD if the vehicle has a net power load, wherein power is drawn from one of, or split between, the high specific-power ESD and the high specific-energy ESD based on a magnitude of the net power load.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system comprising:
   a vehicle;
   a power system onboard the vehicle and configured to provide power to drive the vehicle, the power system comprising:
      a traction drive including an inverter and an AC motor;
      a direct current (DC) link electrically coupled to the traction drive;
      a high specific-power energy storage device (power ESD) electrically coupled to the traction drive to provide power thereto; and
      a high specific-energy energy storage device (energy ESD) electrically coupled to the traction drive to provide power thereto; and
   an energy management system (EMS) configured to:
      determine a net total power of the vehicle, the net total power comprising a sum of a traction drive load demand, an auxiliary device load demand, and a regenerative power provided by regenerative braking of the traction drive;
      cause regenerative power to be provided to each of the power ESD and the energy ESD if the net total power comprises a net supply power, with providing of the net supply power being controlled so as to initially charge the power ESD to a desired state-of-charge (SOC) and subsequently charge the energy ESD;
      cause power to be drawn from the power ESD and the energy ESD if the net total power comprises a net power load, with a split of the power being drawn from the power ESD and the energy ESD such that power is drawn only from the energy ESD if the net power load is below a power load threshold and power is drawn from both the power ESD and energy ESD if the net power load is above the power load threshold;
      maintain a desired voltage on the DC link based on a speed of the AC motor; and
      maintain a desired SOC of the power ESD based on a speed and a relative altitude or slope of travel of the vehicle.

2. The system of claim 1 wherein the EMS, in being programmed to cause the net power load to be provided by each of the power ESD and the energy ESD, is further programmed to
   compare the net power load to a first power load threshold and a second power load threshold;
   cause power to be drawn only from the energy ESD if the net power load is below the first power load threshold;
   cause power to be drawn from each of the power ESD and the energy ESD if the net power load is between the first power load threshold and the second power load threshold; and
   cause power to be drawn from one of the power ESD and energy ESD up to a maximum power or capacity limit thereof if the net power load is above the second power load threshold, with any additional power needed to meet the net power load being drawn from the other of the power ESD and the energy ESD.

3. The system of claim 1 wherein the EMS is further programmed to cause a portion of the regenerative power to first be provided to meet the auxiliary load demand, with a remainder of the regenerative power comprising the net supply power that is provided to each of the power ESD and the energy ESD individually or split between the power ESD and the energy ESD up to their respective power or capacity limits.

4. The system of claim 1 wherein the EMS, in being programmed to maintain a desired voltage on the DC link, is further programmed to:
   increase the voltage on the DC link as the speed of the AC motor increases; and
   decrease the voltage on the DC link as the speed of the AC motor decreases.

5. The system of claim 1 wherein the EMS, in being programmed to maintain a desired SOC of the power ESD, is further programmed to:
   set a SOC set-point for the power ESD; and
   adjust the SOC set-point based on the speed and the relative altitude or slope of travel of the vehicle;
   wherein the SOC set-point is adjusted downward as the speed increases, the relative altitude increases, or the slope of travel is ascending, and the SOC set-point is adjusted upward as the speed decreases, the relative altitude decreases, or the slope of travel is descending.

6. The system of claim 5 wherein the EMS is further programmed to:
   determine a kinetic energy and gravity potential energy based on the speed and relative altitude or the slope of travel of the vehicle, respectively; and
   adjust the SOC set-point by an amount proportional to a sum of the kinetic energy and gravity potential energy.

7. The system of claim 1 wherein the EMS is further programmed to adjust the split of the power to be drawn from the power ESD and the energy ESD based on efficiency and life cycle costs of the power ESD and the energy ESD, where the efficiency of the power ESD is the product of charging efficiency and the discharging efficiency, with the product of the charging efficiency and the discharging efficiency being a round-trip efficiency, and efficiency of the energy ESD being the discharging efficiency, respectively.

8. The system of claim 1 wherein a net supply power is present when the regenerative power is greater than a sum of the traction drive load demand and the auxiliary load demand; and
   wherein a net power load is present when the sum of the traction drive load demand and the auxiliary load demand is greater than the regenerative power.

9. The system of claim 1 wherein the EMS is further programmed to have a variable max recharging power limit to regulate SOC of the power ESD when the system has a net power load, so that the sum of this variable max recharging power limit, the auxiliary load demand, and the traction drive load demand is no more than the max power output limit of the energy ESD.

10. The system of claim 1 wherein the power ESD comprises one of a high performance lithium-ion battery, a bank of ultracapacitors, or a combination thereof; and
    wherein the energy ESD comprises one of a lithium-ion, sodium-metal halide, sodium nickel chloride, sodium-sulfur, nickel-metal hydride or zinc-air battery.

11. The system of claim 1 further comprising one or more bi-directional boost converters configured to manage a power provided to and drawn from at least one of the power ESD and the energy ESD, with operation of the bi-directional boost converters being controlled by the EMS.

12. A system for optimizing energy storage component usage in a vehicle comprising one of a hybrid vehicle, a plug-in hybrid vehicle, and an electric vehicle, the system comprising an energy management system (EMS) programmed to:
   determine a net total power of the vehicle, the net total power comprising a combination of an inverter load demand for driving a traction drive, an auxiliary load demand, and a regenerative power provided by regenerative braking of the traction drive;

determine if the net total power comprises a net supply power or a net power load;

if the net total power comprises a net supply power, then cause the net supply power to be provided to each of a power source and an energy source in the vehicle that provide traction power, wherein the net supply power is first supplied to the power source so as to bring the power source to a state-of-charge (SO C) set-point and is then subsequently supplied to the energy source;

if the net total power comprises a net power load, then:
   compare the net power load to at least one power load threshold; and
   control a drawing of power from the power source and the energy source to meet the inverter and auxiliary load demands such that power is drawn only from the power source if the net power load is below a power load threshold and power is drawn from both the power source and energy source if the net power load is above the power load threshold;

maintain a desired voltage on a DC link in the vehicle based on a speed of a motor in the traction drive; and maintain the power source at the SOC set-point, which is adjusted based on a speed of the vehicle and an altitude and grade of terrain the vehicle is traveling on.

13. The system of claim 12 wherein the EMS, in being programmed to control the drawing of power from the power source and the energy source, is further programmed to:
   compare the net power load to a first power load threshold and a second power load threshold;
   cause power to be drawn only from the energy source if the net power load is below the first power load threshold;
   cause power to be drawn from each of the power source and the energy source if the net power load is between the first power load threshold and the second power load threshold; and
   cause power to be drawn from one of the power source and the energy source up to a maximum power or capacity limit thereof if the net power load is above the second power load threshold, with any additional power needed to meet the net power load being drawn from the other of the power source and the energy source.

14. The system of claim 12 wherein the EMS, in being programmed to control the drawing of power from the power source and the energy source, is further programmed to maximize the efficiency of power source and the energy source, wherein the efficiency of the power source is the product of charging efficiency and discharging efficiency, with the product of the charging efficiency and the discharging efficiency being a round-trip efficiency, and efficiency of the energy source is the discharging efficiency, respectively.

15. The system of claim 12 wherein the EMS is further programmed to first cause regenerative power to be provided to the auxiliary load before causing regenerative power to be provided to the power source and the energy source.

16. The system of claim 12 wherein the EMS, in being programmed to maintain the desired voltage on the DC link, is further programmed to increase the voltage on the DC link as the speed of the motor increases and decrease the voltage on the DC link as the speed of the motor decreases.

17. The system of claim 12 wherein the EMS, in being programmed to determine and maintain the SOC set-point of the power source, is further programmed to adjust the SOC set-point downward as the speed and altitude of the terrain increase and adjust the SOC set-point upward as the speed and altitude of the terrain decrease.

18. The system of claim 12 wherein the EMS is further programmed to have a variable max recharging power limit to regulate SOC of the power source when the system has a net power load, so that the sum of this variable max recharging power limit, the auxiliary load demand, and the traction drive load demand is no more than the max power output limit of the energy source.

19. A method for optimizing energy storage component usage in a vehicle having a high specific-power energy storage device (ESD) and a high specific-energy ESD coupled to a traction drive by way of a direct current (DC) link, the method comprising:
   determining a desired operating voltage for the DC link in the vehicle based on a speed of a motor in the traction drive;
   determining a state-of-charge (SOC) set-point for the high specific-power ESD based on a speed of the vehicle and an altitude of the road being traveled by the vehicle;
   determining a power state of the vehicle based on a summation of a traction drive load demand, an auxiliary device load demand, and a regenerative power supply provided by regenerative braking of the traction drive, the power state comprising a net power supply or a net power load;
   selectively providing a charging power to the high specific-power ESD and the high specific-energy ESD if the vehicle has a net power supply, wherein charging power is provided so as to initially charge the high specific-power ESD to the determined SOC set-point before charging the high specific-energy ESD; and
   selectively drawing power from the high specific-power ESD and the high specific-energy ESD if the vehicle has a net power load, wherein power is drawn from the high specific-power ESD and the high specific-energy ESD such that power is drawn only from the energy ESD if the net power load is below a power load threshold and power is drawn from both the power ESD and energy ESD if the net power load is above the power load threshold.

20. The method of claim 19 further comprising:
   comparing the net power load to a first power load threshold and a second power load threshold;
   causing power to be drawn only from the high specific-energy ESD if the net power load is below the first power load threshold;
   causing power to be drawn from each of the high specific-power ESD and the high specific-energy ESD if the net power load is between the first power load threshold and the second power load threshold; and
   causing a maximum power to be drawn from one of the high specific-power ESD and the high specific-energy ESD if the net power load is above the second power load threshold, with any additional power needed to meet the net power load being drawn from the other of the high specific-power ESD and the high specific-energy ESD.

21. The method of claim 19 further comprising causing regenerative power to be provided to meet the auxiliary load demand before causing regenerative power to be provided to the high specific-energy ESD and the high specific-power ESD.

22. The method of claim 19 further comprising:
   increasing the voltage on the DC link as the speed of the motor increases;
   decreasing the voltage on the DC link as the speed of the motor decreases;

increasing the SOC set-point as the speed of the vehicle decreases and the road altitude and road grade decreases; and decreasing the SOC set-point as the speed of the vehicle increases and the road altitude and road grade increases.

23. The method of claim 19 further comprising have a variable max recharging power limit to regulate SOC of the high specific-power ESD when the vehicle has a net power load, so that the sum of the variable max recharging power limit, the auxiliary device load demand and the traction drive load demand is no more than the max power output limit of the high specific-energy ESD.

24. A system comprising:
  a vehicle;
  a power system onboard the vehicle and configured to provide power to drive the vehicle, the power system comprising:
    a traction drive including an inverter and an AC motor;
    a direct current (DC) link electrically coupled to the traction drive;
    a high specific-power energy storage device (power ESD) electrically coupled to the traction drive to provide power thereto; and
    a high specific-energy energy storage device (energy ESD) electrically coupled to the traction drive to provide power thereto; and
  an energy management system (EMS) configured to:
    determine a net total power of the vehicle, the net total power comprising a sum of a traction drive load demand, an auxiliary device load demand, and a regenerative power provided by regenerative braking of the traction drive;
    cause regenerative power to be provided to each of the power ESD and the energy ESD if the net total power comprises a net supply power, with providing of the net supply power being controlled so as to initially charge the power ESD to a desired state-of-charge (SOC) and subsequently charge the energy ESD; and
    cause power to be drawn from the power ESD and the energy ESD if the net total power comprises a net power load, with a split of the power being drawn from the power ESD and the energy ESD such that power is drawn only from the energy ESD if the net power load is below a power load threshold and power is drawn from both the power ESD and energy ESD if the net power load is above the power load threshold.

* * * * *